(12) United States Patent
Maekawa et al.

(10) Patent No.: US 8,727,522 B2
(45) Date of Patent: May 20, 2014

(54) ULTRAVIOLET CROSSLINKING INK AND INKJET RECORDING METHOD

(75) Inventors: Tsutomu Maekawa, Kanagawa (JP); Okitoshi Kimura, Kanagawa (JP); Eiji Noda, Kanagawa (JP); Tamotsu Aruga, Saitama (JP); Shinya Seno, Kanagawa (JP); Noriyasu Takeuchi, Kanagawa (JP); Masayuki Koyano, Kanagawa (JP); Takao Hiraoka, Kanagawa (JP); Tomoko Hasegawa, Ibaraki (JP); Soh Noguchi, Kanagawa (JP)

(73) Assignee: Ricoh Company, Ltd., Tokyo (JP)

(*) Notice: Subject to any disclaimer, the term of this patent is extended or adjusted under 35 U.S.C. 154(b) by 187 days.

(21) Appl. No.: 13/342,382

(22) Filed: Jan. 3, 2012

(65) Prior Publication Data

US 2012/0176456 A1    Jul. 12, 2012

(30) Foreign Application Priority Data

Jan. 4, 2011    (JP) ................. 2011-000277

(51) Int. Cl.
*B41J 2/01*    (2006.01)

(52) U.S. Cl.
USPC ........................ 347/100; 347/95; 347/102

(58) Field of Classification Search
USPC ............ 347/100, 95, 96, 102, 88, 99, 21, 22; 106/31.6, 31.13, 31.27; 523/160, 161
See application file for complete search history.

(56) References Cited

U.S. PATENT DOCUMENTS

| | | | |
|---|---|---|---|
| 4,554,555 A | 11/1985 | Aruga et al. | |
| 4,581,071 A | 4/1986 | Akutsu et al. | |
| 4,620,876 A | 11/1986 | Fujii et al. | |
| 4,631,085 A | 12/1986 | Kawanishi et al. | |
| 4,647,310 A | 3/1987 | Shimada et al. | |
| 4,711,668 A | 12/1987 | Shimada et al. | |
| 4,713,113 A | 12/1987 | Shimada et al. | |
| 4,737,190 A | 4/1988 | Shimada et al. | |
| 4,793,860 A | 12/1988 | Murakami et al. | |
| 5,622,550 A | 4/1997 | Konishi et al. | |
| 5,640,187 A * | 6/1997 | Kashiwazaki et al. | 347/101 |
| 5,810,915 A | 9/1998 | Nagai et al. | |
| 5,879,439 A | 3/1999 | Nagai et al. | |
| 5,882,390 A | 3/1999 | Nagai et al. | |
| 5,972,082 A | 10/1999 | Koyano et al. | |
| 5,993,524 A | 11/1999 | Nagai et al. | |
| 6,106,602 A | 8/2000 | Ouchi et al. | |
| 6,120,589 A | 9/2000 | Bannai et al. | |
| 6,231,652 B1 | 5/2001 | Koyano et al. | |
| 6,261,349 B1 | 7/2001 | Nagai et al. | |
| 6,613,136 B1 | 9/2003 | Arita et al. | |
| 6,688,737 B2 | 2/2004 | Nagai et al. | |
| 6,695,443 B2 | 2/2004 | Arita et al. | |

(Continued)

FOREIGN PATENT DOCUMENTS

JP    2003-313464    11/2003
JP    2006-213883    8/2006

*Primary Examiner* — Manish S Shah
(74) *Attorney, Agent, or Firm* — Cooper & Dunham LLP

(57) ABSTRACT

An ultraviolet crosslinking ink including a radically polymerizable and anionically polymerizable monomer; a photoradical generator; and a photo-base generator. An inkjet recording method including ejecting an ultraviolet crosslinking ink including a radically polymerizable and anionically polymerizable monomer; a photoradical generator; a photo-base generator; and a colorant, toward a surface of a recording material to form an ink image, and irradiating the ink image with ultraviolet light using a light emitting diode.

6 Claims, 1 Drawing Sheet

(56) References Cited

U.S. PATENT DOCUMENTS

| | | | |
|---|---|---|---|
| 6,730,155 B2 | 5/2004 | Gotoh et al. | |
| 6,786,588 B2 | 9/2004 | Koyano et al. | |
| 6,799,845 B2 | 10/2004 | Kaneko et al. | |
| 7,033,013 B2 | 4/2006 | Koyano et al. | |
| 7,137,696 B2* | 11/2006 | Siegel | 347/102 |
| 7,919,544 B2 | 4/2011 | Matsuyama et al. | |
| 7,950,793 B2 | 5/2011 | Aruga et al. | |
| 8,044,114 B2 | 10/2011 | Habashi et al. | |
| 2003/0069329 A1* | 4/2003 | Kubota et al. | 523/160 |
| 2006/0092254 A1* | 5/2006 | Claes et al. | 347/102 |
| 2006/0160925 A1* | 7/2006 | Nakajima | 523/160 |
| 2007/0129457 A1* | 6/2007 | Nakano et al. | 522/1 |
| 2007/0197685 A1 | 8/2007 | Aruga et al. | |
| 2008/0180503 A1* | 7/2008 | Umebayashi | 347/102 |
| 2008/0273045 A1 | 11/2008 | Morohoshi et al. | |
| 2009/0162569 A1 | 6/2009 | Morohoshi et al. | |
| 2009/0186162 A1 | 7/2009 | Namba et al. | |
| 2010/0196601 A1 | 8/2010 | Goto et al. | |
| 2010/0196602 A1 | 8/2010 | Koyano et al. | |
| 2011/0057981 A1 | 3/2011 | Aruga et al. | |
| 2011/0060100 A1 | 3/2011 | Kimura et al. | |
| 2011/0065824 A1* | 3/2011 | Fujita et al. | 522/28 |
| 2011/0298876 A1* | 12/2011 | Takeuchi et al. | 347/102 |

* cited by examiner

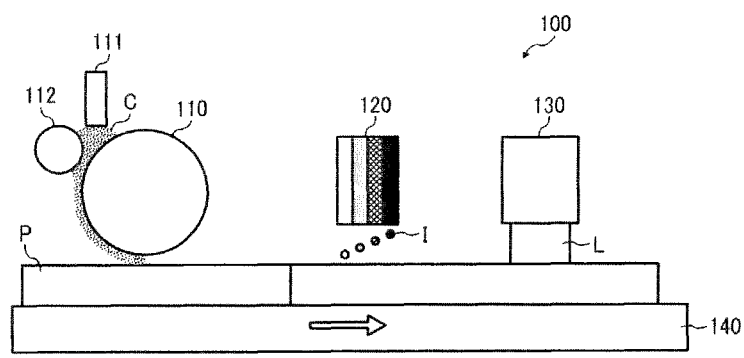

ULTRAVIOLET CROSSLINKING INK AND INKJET RECORDING METHOD

CROSS-REFERENCE TO RELATED APPLICATIONS

This patent application is based on and claims priority pursuant to 35 U.S.C. §119 to Japanese Patent Application No. 2011-000277, filed on Jan. 4, 2011 in the Japan Patent Office, the entire disclosure of which is hereby incorporated herein by reference.

TECHNICAL FIELD

This disclosure relates to an ultraviolet crosslinking ink, and to an inkjet recording method.

BACKGROUND

Recently, there are various image forming methods such as silver halide photography, electrophotography, thermal transfer recording methods, and inkjet recording methods. Among these image forming methods, inkjet recording methods are used for various printing fields such as plain paper printing, photographic image printing, marking, color filter formation, and the like because of being capable of producing images at low costs. Inkjet recording methods are broadly classified into aqueous-ink type inkjet recording methods using an aqueous ink, solvent-ink type inkjet recording methods using a solvent ink which includes a quick-drying organic solvent so as to be dried quickly, photocrosslinking-ink type inkjet recording methods in which a recorded image is irradiated with ultraviolet light to be crosslinked, and thermofusible-ink type inkjet recording methods which include heating an ink which is solid at room temperature to liquefy the ink, and then ejecting the liquefied ink to form an image.

The photocrosslinking-ink type inkjet recording methods have advantages over the solvent-ink type inkjet recording methods that odor is less, the drying speed is faster, and images can be recorded even on recording materials which hardly absorb ink.

There is a proposal for an ultraviolet crosslinking inkjet ink which includes an oxetane compound or an alicyclic epoxy compound, and an (meth)acrylate compound and which further includes a photo-acid generator in an amount of from 1% to 10% by weight and a photoradical generator in an amount of from 0 to 1% by weight.

However, when the ink includes a photoradical generator capable of crosslinking the ink when using a light emitting diode (LED), the ink typically causes a problem in that images formed by the ink are yellowed (hereinafter referred to as a yellowing problem).

For these reasons, the inventors recognized that there is a need for an ultraviolet crosslinking ink which includes a photoradical generator capable of crosslinking the ink when using a light emitting diode (LED) but which does not cause the yellowing problem.

SUMMARY

As an aspect of this disclosure, an ultraviolet crosslinking ink is provided which includes a radically polymerizable and anionically polymerizable monomer, a photoradical generator, and a photo-base generator.

As another aspect of this disclosure, an inkjet recording method is provided which includes ejecting the above-mentioned ultraviolet crosslinking ink toward a surface of a recording material to form an ink image thereon, and irradiating the ink image with ultraviolet light using a light emitting diode.

The aforementioned and other aspects, features and advantages will become apparent upon consideration of the following description of the preferred embodiments taken in conjunction with the accompanying drawings.

BRIEF DESCRIPTION OF THE SEVERAL VIEWS OF THE DRAWINGS

FIGURE is a schematic front view illustrating an inkjet recording device for use in the inkjet recording method of this disclosure.

DETAILED DESCRIPTION

This disclosure will be described by reference to a drawing.

Initially, the ultraviolet crosslinking ink of this disclosure will be described.

The ultraviolet crosslinking ink of this disclosure includes a radically polymerizable and anionically polymerizable monomer, a photoradical generator, and a photo-base generator. Therefore, occurrence of the yellowing problem can be prevented even when a light emitting diode (LED) is used for crosslinking the ink.

Specific examples of the radically polymerizable and anionic polymerizable monomer include (meth)acrylic acid compounds, (meth)acrylamide compounds, aromatic vinyl compounds, vinyl acetate, maleimide compounds, maleic acid compounds, and lactone compounds, but are not limited thereto. These compounds can be used alone or in combination.

Specific examples of monofunctional compounds of the (meth)acrylic acid compounds include hexyl(meth)acrylate, 2-ethylhexyl(meth)acrylate, t-octyl(meth)acrylate, isoamyl (meth)acrylate, decyl(meth)acrylate, isodecyl(meth)acrylate, stearyl(meth)acrylate, isostearyl(meth)acrylate, cyclohexyl(meth)acrylate, 4-n-butylcyclohexyl(meth)acrylate, bornyl(meth)acrylate, isobornyl(meth)acrylate, benzyl (meth)acrylate, 2-ethylhexyldiglycol(meth)acrylate, butoxyethyl(meth)acrylate, 2-chloroethyl(meth)acrylate, 4-bromobutyl(meth)acrylate, cyanoethyl(meth)acrylate, butoxymethyl(meth)acrylate, 3-methoxybutyl(meth)acrylate, alkoxymethyl(meth)acrylate, alkoxyethyl(meth)acrylate, 2-(2-methoxyethoxy)ethyl(meth)acrylate, 2-(2-butoxyethoxy)ethyl(meth)acrylate, 2,2,2-trifluoroethyl(meth) acrylate, 1H,1H,2H,2H-perfluorodecyl(meth)acrylate, 4-butylphenyl(meth)acrylate, phenyl(meth)acrylate, 2,4,5-trimethylphenyl(meth)acrylate, 4-chlorophenyl(meth)acrylate, phenoxymethyl(meth)acrylate, phenoxyethyl(meth) acrylate, glycidyl(meth)acrylate, glycidyloxybutyl(meth) acrylate, glycidyloxyethyl(meth)acrylate, glycidyloxypropyl (meth)acrylate, tetrahydrofurfryl(meth)acrylate, hydroxyalkyl(meth)acrylate, 2-hydroxyethyl(meth)acrylate, 3-hydroxypropyl(meth)acrylate, 2-hydroxypropyl(meth) acrylate, 2-hydroxybutyl(meth)acrylate, 4-hydroxybutyl (meth)acrylate, dimethylaminoethyl(meth)acrylate, diethylaminoethyl(meth)acrylate, dimethylaminopropyl(meth) acrylate, diethylaminopropyl(meth)acrylate, trimethoxysilylpropyl(meth)acrylate, trimethysilylpropyl (meth)acrylate, polyethylene oxide monomethyl ether(meth) acrylate, oligoethylene oxide monomethyl ether(meth)acrylate, polyethylene oxide(meth)acrylate, oligoethylene oxide (meth)acrylate, oligoethylene oxide monoalkyl ether(meth) acrylate, polyethylene oxide monoalkyl ether(meth)acrylate, dipropylene glycol(meth)acrylate, polypropylene oxide monoalkyl ether(meth)acrylate, oligopropylene oxide monoalkyl ether(meth)acrylate, 2-methacryloyloxyethyl succinate, 2-methacryloyloxyhexahydro phthalate, 2-methacryloyloxyethyl-2-hydroxypropyl phthalate, butoxydiethylene glycol(meth)acrylate, trifluoroethyl(meth)acrylate, perfluorooctylethyl(meth)acrylate, 2-hydroxy-3-phenoxypropyl (meth)acrylate, (meth)acrylate of EO modified phenol, (meth)acrylate of EO modified cresol, (meth)acrylate of EO modified nonylphenol, (meth)acrylate of PO modified nonylphenol, EO modified 2-ethylhexyl(meth)acrylate, and the like.

Specific examples of difunctional compounds of the (meth)acrylic acid compounds include 1,6-hexanediol di(meth)acrylate, 1,10-decanediol di(meth)acrylate, neopentyl glycol di(meth)acrylate, 2,4-dimethyl-1,5-pentanediol di(meth)acrylate, butylethylpropanediol di(meth)acrylate, cyclohexane dimethanol di(meth)acrylate, polyethylene glycol di(meth)acrylate, oligoethylene glycol di(meth)acrylate, ethylene glycol di(meth)acrylate, 2-ethyl-2-butylbutanediol di(meth)acrylate, neopentyl glycol hydroxypivalate di(meth) acrylate, EO modified bisphenol A di(meth)acrylate, bisphenol F polyethoxylate di(meth)acrylate, polypropylene glycol di(meth)acrylate, oligopropylene glycol di(meth)acrylate, 1,4-butanediol di(meth)acrylate, 2-ethyl-2-butylpropanediol di(meth)acrylate, 1,9-nonanediol di(meth)acrylate, propoxylated ethoxylated bisphenol A di(meth)acrylate, tricyclodecane di(meth)acylate, and the like.

Specific examples of trifunctional compounds of the (meth)acrylic acid compounds include trimethylolpropane tri(meth)acylate, trimethylolethane tri(meth)acylate, alkylene oxide modified trimethylolpropane tri(meth)acylate, pentaerythritol tri(meth)acylate, dipentaerythritol tri(meth) acylate, trimethylolpropane tris((meth)acryloyloxypropyl) ether, tri(meth)acylate of alkylene oxide modified isocyanuric acid, dipentaerythritol propionate tri(meth)acylate, tris (meth)acryloyloxyethyl isocyanurate, hydroxypivalaldehyde modified dimethylolpropane tri(meth)acylate, sorbitol tri (meth)acylate, trimethylolpropane tri(meth)acylate, glycerin tri(meth)acylate, and the like.

Specific examples of monofunctional compounds of the (meth)acrylamide compounds include (meth)acrylamide, N-methyl(meth)acrylamide, N-ethyl(meth)acrylamide, N-propyl(meth)acrylamide, N-n-butyl(meth)acrylamide, N-t-butyl(meth)acrylamide, N-butoxymethyl(meth)acrylamide, N-isopropyl(meth)acrylamide, N-methylol(meth) acrylamide, N,N-dimethyl(meth)acrylamide, N,N-diethyl (meth)acrylamide, (meth)acryloyl morpholine, and the like.

Specific examples of the monofunctional aromatic vinyl compounds include styrene, methylstyrene, dimethylstyrene, trimethylstyrene, ethylstyrene, isopropylstyrene, chloromethylstyrene, methoxystyrene, acetoxystyrene, chlorostyrene, dichlorostyrene, bromostyrene, methyl vinylbenzoate, 3-methylstyrene, 4-methylstyrene, 3-ethylstyrene, 4-ethylstyrene, 3-propylstyrene, 4-propylstyrene, 3-butylstyrene, 4-butylstyrene, 3-hexylstyrene, 4-hexylstyrene, 3-octylstyrene, 4-octylstyrene, 3-(2-ethylhexyl)styrene, 4-(2-ethylhexyl)styrene, allylstyrene, isopropenylstyrene, butenylstyrene, octenylstyrene, 4-t-butoxycarbonylstyrene, 4-methoxystyrene, 4-t-butoxystyrene, and the like.

Specific examples of the maleimide compounds include 4,4'-diphenylmethane bismaleimide, phenylene bismaleimide, bisphenol A diphenyl ether bismaleimide, 3,3'-dimethyl-5-5'-diethyl-4,4'-diphenylmethane bismaleimide, 4-methyl-1,3-phenylene bismaleimide, 1,6'-bismaleimide-(2,2,4-trimethyl)hexane, and the like.

Specific examples of the maleic acid compounds include bis(2-ethylhexyl)maleate, and the like.

Specific examples of the lactone compounds include γ-butyrolactone(meth)acrylate, and the like.

The material for use as the photoradical generator included in the ultraviolet crosslinking ink is not particularly limited as long as the material can produce a radical when being irradiated with ultraviolet light. Specific examples of the material for use as the photoradical generator include benzoin ethers such as benzoin alkyl ethers; acetophenone compounds such as 1,1-dichloroacetophenone, benzyldimethylketal, 1-hydroxycyclohexyl phenyl ketone, 2-hydroxy-2-methyl-1-phenylpropane-1-one, and p-isopropyl-α-hydroxyisobutylphenone; benzophenones such as benzophenone; thioxanthones such as 2-chlorothioxanthone; acylphosphine oxide; methylphenylglyoxylate, and the like. These compounds can be used alone or in combination.

Specific examples of commercial products of the photoradical generators include VICUREs 10, 30 and 55 (from Akzo Chemicals Inc.); KAYACUREs BP-100, BMS, DETX-S, CTX, 2-EAQ, DMBI, and EPA (from Nippon Kayaku Co., Ltd.); IRGACUREs 127, 184, 819, 907, 369, 379, 500 and 2959, DAROCURs 1173 and MBF, and LUCIRINs TPO and TPO-L (from BASF); COUNTERCUREs CTX, BMS, ITX, PDO, BEA, and DMB (from Ward Blenkinsop); SUNCUREs IP and BTTP (from NOF Corporation); UV636 (from Kawasaki Kasei Chemicals Ltd.); etc.

The content of the photoradical generator in the ultraviolet crosslinking ink is from 1% to 30% by weight based on the weight of the radically polymerizable and anionically polymerizable monomer components included in the ink. When the content is less than 1% by weight, the amount of generated radicals decreases, thereby often causing a problem in that an ink image is insufficiently crosslinked. In contrast, when the content is greater than 30% by weight, the preservability of the ink often deteriorates.

The material for use as the photo-base generator included in the ultraviolet crosslinking ink is not particularly limited as long as the material can generate a base when being irradiated with ultraviolet light. Specific examples of the material for use as the photo-base generator include primary or secondary amines such as o-nitrobenzyl carbamate, α,α-dimethylbenzyl carbamate, α-ketocarbamic acid derivatives, and N-hydroxyimide carbamate; ammonium phenylglyoxylate, benzhydryl ammonium salt, benzophenonemethyltrialkyl ammonium borate, dialkylphenacylammonium borate, dithiocarbamates, thiocyanates, amineimide derivatives, and the like. These compounds can be used alone or in combination.

Specific examples of commercial products of the photobase generators include ANC-101 (anisoin N-cyclohexylcarbamate), and NB101 (2-nitrobenzyl N-cyclohexylcarbamate) from Midori Kagaku Co., Ltd.; etc.

The content of the photo-base generator in the ultraviolet crosslinking ink is from 0.1% to 20% by weight based on the weight of the ink. When the content is less than 0.1% by weight, the amount of a base generated by the photo-base generator decreases, thereby often causing a problem in that an ink image is insufficiently crosslinked. In contrast, when the content is greater than 20% by weight, the preservability of the ink often deteriorates.

The ultraviolet crosslinking ink optionally includes a colorant.

Specific examples of the colorant include red or magenta pigments such as C.I. Pigment Reds 3, 5, 19, 22, 31, 38, 43, 48:1, 48:2, 48:3, 48:4, 48:5, 49:1, 53:1, 57:1, 57:2, 58:4, 63:1, 81, 81:1, 81:2, 81:3, 81:4, 88, 104, 108, 112, 122, 123, 144, 146, 149, 166, 168, 169, 170, 177, 178, 179, 184, 185, 208, 216, 226 and 257, C.I. Pigment Violets 3, 19, 23, 29, 30, 37, 50 and 88, and C.I. Pigment Oranges 13, 16, 20 and 36; blue or cyan pigments such as C.I. Pigment Blues 1, 15, 15:1, 15:2, 15:3, 15:4, 15:6, 16, 17-1, 22, 27, 28, 29, 36 and 60; green pigments such as C.I. Pigment Greens 7, 26, 36 and 50; yellow pigments such as C.I. Pigment Yellows 1, 3, 12, 13, 14, 17, 34, 35, 37, 55, 74, 81, 83, 93, 94, 95, 97, 108, 109, 110, 128, 137, 138, 139, 150, 151, 153, 154, 155, 157, 166, 167, 168, 180, 185 and 193; black pigments such as C.I. Pigment Blacks 7, 28 and 26; etc.

These pigments can be used alone or in combination. Among the blue or cyan pigments, C.I. Pigment Blue 15:3 and C.I. Pigment Blue 15:4 are preferable.

Specific examples of commercial products of the colorants include CHROMOFINE YELLOWs 2080, 5900, 5930, AF-1300 and 2700L, CHROMOFINE ORANGEs 3700L and 6730, CHROMOFINE SCARLET 6750, CHROMOFINE MAGENTAs 6880, 6886, 6891N, 6790 and 6887, CHROMOFINE VIOLET RE, CHROMOFINE REDs 6820 and 6830, CHROMOFINE BLUEs HS-3, 5187, 5108, 5197, 5085N, SR-5020, 5026, 5050, 4920, 4927, 4937, 4824, 4933GN-EP, 4940, 4973, 5205, 5208, 5214, 5221 and 5000P, CHROMOFINE GREENs 2GN, 2GO, 2G-550D, 5310, 5370 and 6830, CHROMOFINE BLACK A-1103, SEIKA FAST YELLOWs 10GH, A-3, 2035, 2054, 2200, 2270, 2300, 2400 (B), 2500, 2600, ZAY-260, 2700(B) and 2770, SEIKA FAST REDs 8040, C405(F), CA120, LR-116, 1531B, 8060R, 1547, ZAW-262, 1537B, GY, 4R-4016, 3820, 3891 and ZA-215, SEIKA FAST CARMINEs 6B1476T-7, 1483LT, 3840 and 3870, SEIKAFAST BORDEAUX 10B-430, SEIKALIGHT ROSE R40, SEIKALIGHT VIOLETs B800 and 7805, SEIKAFAST MAROON 460N, SEIKAFAST ORANGEs 900 and 2900, SEIKALIGHT BLUEs C718 and A612, and CYANINE BLUEs 4933M, 4933GN-EP, 4940 and 4973, which are from Dainichiseika Color & Chemicals Mfg. Co., Ltd.; KET YELLOWs 401, 402, 403, 404, 405, 406, 416 and 424, KET ORANGE 501, KET REDs 301, 302, 303, 304, 305, 306, 307, 308, 309, 310, 336, 337, 338 and 346, KET BLUEs 101, 102, 103, 104, 105, 106, 111, 118 and 124, and KET GREEN 201, which are from DIC Corporation; COLORTEX YELLOWs 301, 314, 315, 316, P-624, 314, U10GN, U3GN, UNN, UA-414 and U263, FINECOL YELLOWs T-13 and T-05, PIGMENT YELLOW 1705, COLORTEX ORANGE 202, COLORTEX REDs 101, 103, 115, 116, D3B, P-625, 102, H-1024, 105C, UFN, UCN, UBN, U3BN, URN, UGN, UG276, U456, U457, 105C and USN, COLORTEX MAROON 601, COLORTEX BROWN B610N, COLORTEX VIOLET 600, PIGMENT RED 122, COLORTEX BLUEs 516, 517, 518, 519, A818, P-908 and 510, COLORTEX GREENs 402 and 403, and COLORTEX BLACKs 702 and U905, which are from Sanyo Color Works, Ltd.; LIONOL YELLOW 1405G, and LIONOL BLUEs FG7330, FG7350, FG7400G, FG7405G, ES and ESP-S, which are from Toyo Ink Co., Ltd.; TONER MAGENTA E02, PERMANENT RUBIN F6B, TONER YELLOW HG, PERMANENT YELLOW GG-02, and HOSTAPEAM BLUE B2G, which are from Hoechst AG; Carbon blacks #2600, #2400, #2350, #2200, #1000, #990, #980, #970, #960, #950, #850, MCF88, #750, #650, MA600, MA7, MA8, MA11, MA100, MA100R, MA77, MA220, #52, #50, #47, #45, #45L, #40, #33, #32, #30, #25, #20, #10, #5, #44 and CF9, which are from Mitsubishi Chemical Corporation; etc.

The content of the colorant in the ultraviolet crosslinking ink is from 0.1% to 20% by weight based on the weight of the ink. When the content is less than 0.1% by weight, the image density often deteriorates. In contrast, when the content is greater than 20% by weight, the viscosity of the ink increases, thereby often deteriorating the ejecting property of the ink.

An ultraviolet crosslinking clear ink including no colorant can be used as the ultraviolet crosslinking ink of this disclosure.

The photoradical generator for use in such a clear ink is not particularly limited as long as the photoradical generator does not cause the yellowing problem mentioned above. Suitable materials for use as the photoradical generator for use in a clear ink include α-hydroxyketone, α-hydroxyketone blend, and the like.

Specific examples of commercial products of the photoradical generator for use in such a clear ink include IRGACURE 184, IRGACURE 500, and DAROCURE 1173, which are from BASF; NK1200 and NK1300, which are from DAICEL-UCB Co., Ltd.; etc.

The ultraviolet crosslinking ink of this disclosure can further include an oligomer, and/or a radically polymerizable and anionically polymerizable prepolymer to improve adhesion of the ink to recording materials.

The ultraviolet crosslinking ink of this disclosure can further include a solvent to adjust the viscosity of the ink.

The solvent is not particularly limited as long as the solvent can dissolve or disperse the components of the ink while being easily evaporated after ink images are formed. Specific examples of the solvent include ketones such as acetone, methyl ethyl ketone, and methyl isobutyl ketone; alcohols such as methanol, ethanol and isopropanol; water, and the like. These solvents can be used alone or in combination.

The ultraviolet crosslinking ink of this disclosure can further include known additives such as sensitizers, light stabilizers, surface modification agents for modifying the surface of printed images (such as leveling agents and lubricants (e.g., waxes)), surfactants, viscosity reducers, antioxidants, anti-aging agents, crosslinking promoters, polymerization inhibitors, plasticizers, antiseptic agents, pH adjusters, antifoamers, humectants, dispersants, dyes and the like.

The ultraviolet crosslinking ink of this disclosure is typically prepared by mixing ink components, which include at least a radically polymerizable and anionically polymerizable monomer, a photoradical generator, and a photo-base generator, using a mixer.

Specific examples of the mixer include, but are not limited thereto, high speed dispersers, impeller dispersers, gate mixers, bead mills, sand mills, PEARL MILLs, COBRA MILLs, pin mills, MORINEX MILLs, agitator mills, universal mills, CENTURY MILLs, pressure mills, two-roll extruders, two-roll mills, three-roll mills, NITSCHE MILLs, kneaders, mixers, colloid mills, stone mills, KEDDY MILLs, planet ball mills, ball mills, paddle mixers, attritors, flow jet mixers, thrasher mills, CLEARMIX, RYNO MILLs, pin-type bead mills, horizontal bead mills, and the like.

The ultraviolet crosslinking ink of this disclosure is applied to ultraviolet crosslinking type inkjet recording apparatuses.

FIG. 1 is a schematic front view illustrating an inkjet recording device for use in the inkjet recording method of this disclosure.

Referring to FIG. 1, an ultraviolet crosslinking type inkjet recording device 100 includes a roller coater 110 to coat the surface of a paper sheet P serving as a recording material with an ultraviolet crosslinking clear ink C, which is the ultraviolet crosslinking ink of this disclosure; an inkjet recording head 120 to eject ultraviolet crosslinking inks I, each of which is the ultraviolet crosslinking ink of this disclosure, toward the surface of the paper sheet P, on which the clear ink C has been applied, to form an ink image thereon; and a light emitting diode 130 to irradiate the surface of the paper sheet P bearing the ink image with ultraviolet light L to crosslink the clear ink and the ink image. In the vicinity of the roller coater 110, a slit coater 111 to supply the clear ink C to the roller coater 110, and a doctor roller 112 to remove an excess of the clear ink C applied to the roller coater 110 are provided. The inkjet recording head 120 ejects yellow (Y), magenta (M), cyan (C) and black (K) inks, each of which is the ultraviolet crosslinking ink of this disclosure, utilizing change of pressure caused by a piezoelectric device provided in an ink passage of the recording head 120. In addition, the paper sheet P is fed by a conveyer 140.

In this regard, a controller of the inkjet recording device 100 controls the operation of the inkjet recording device 100 and the data processing therefor, such as driving the recording head 120 to eject the ultraviolet crosslinking inks I and driving the conveyer 140 to feed the paper sheet P.

The coater to coat the ultraviolet crosslinking clear ink C is not limited to the roller coater 110, and any known coaters such as slit coaters and inkjet recording heads can also be used therefor.

In addition, the light source to emit ultraviolet light is not limited to the light emitting diode 130, and any known light sources capable of emitting ultraviolet light such as low pressure mercury lamps, middle pressure mercury lamps, high pressure mercury lamps, and xenon excimer lamps can also be used therefor.

Further, the recording material is not limited to the paper sheet P, and any known materials such as metal products, cans, plastic products, wood products, inorganic material products, painted products, laminated products, and films (e.g., PET films) can also be used therefor. In this regard, the recording material may be subjected to a treatment such as embossing, Braille embossing, and surface roughening before image formation.

Having generally described this invention, further understanding can be obtained by reference to certain specific examples which are provided herein for the purpose of illustration only and are not intended to be limiting. In the descriptions in the following examples, the numbers represent weight ratios in parts, unless otherwise specified.

EXAMPLES

Example 1

The following components were mixed by a homogenizer HG30 from Hitachi Koki Co., Ltd., followed by filtering to prepare an ultraviolet crosslinking clear ink.

| | |
|---|---|
| Acryloylmorphorine (ACMO from Kohjin Co., Ltd. serving as a radically polymerizable and anionically polymerizable monomer) | 100 parts |
| Photoradical generator (1-hydroxycyclohexyl phenyl ketone, IRGACURE 184 from BASF) | 10 parts |
| Photo-base generator (anisoin N-cyclohexylcarbamate, ANC-101 from Midori Kagaku Co., Ltd.) | 10 parts |

The thus prepared clear ink was applied on a white PET film using a wire bar #4 having a wire with a diameter of 0.1 mm, and the coated clear ink layer was exposed to ultraviolet light for 2 second, which was emitted by a spot-type ultraviolet crosslinking device using a light emitting diode, AICURE UJ20 from Panasonic Electric Works Automation Controls Co., Ltd., to be crosslinked. The resultant crosslinked clear ink layer was clear and glossy.

The color difference ($\Delta E$) between the crosslinked clear ink layer and the white PET film, which was measured with a colorimeter X-RITE 939 from X-Rite Corp., was 2.2, and the crosslinked clear ink layer was hardly yellowed. In this regard, when the color difference ($\Delta E$) is not greater than 5, the degree of yellowing is small.

Example 2

The procedure for preparation and evaluation of the crosslinked clear ink layer in Example 1 was repeated except that the photoradical generator (IRGACURE 184) was replaced with 10 parts of another photoradical generator (2-hydroxy-1-[4-[4-(2-hydroxy-2-methylpropionyl)benzyl]phenyl]-2-methylpropane-1-one, IRGACURE 127 from BASF).

The resultant crosslinked clear ink layer was clear and glossy, and the color difference ($\Delta E$) between the crosslinked clear ink layer and the white PET film was 2.7.

Example 3

The procedure for preparation and evaluation of the crosslinked clear ink layer in Example 1 was repeated except that the photoradical generator (IRGACURE 184) was replaced with 10 parts of another photoradical generator, a 2-hydroxy-2-methylpropiophenone compound (UV636 from Kawasaki Kasei Chemicals Ltd.).

The resultant crosslinked clear ink layer was clear and glossy, and the color difference ($\Delta E$) between the crosslinked clear ink layer and the white PET film was 2.6.

Example 4

The procedure for preparation and evaluation of the crosslinked clear ink layer in Example 1 was repeated except that the photoradical generator (IRGACURE 184) was replaced with 10 parts of another photoradical generator, 2,4,6-trimethybenzoyldiphenyl phosphine oxide (LUCIRIN TPO from BASF).

The resultant crosslinked clear ink layer was clear and glossy, and the color difference ($\Delta E$) between the crosslinked clear ink layer and the white PET film was 3.9.

Example 5

The following components were mixed by a homogenizer HG30 from Hitachi Koki Co., Ltd., followed by filtering to prepare an ultraviolet crosslinking cyan ink.

| | |
|---|---|
| Acryloylmorphorine (ACMO from Kohjin Co., Ltd. serving as a radically polymerizable and anionically polymerizable monomer) | 100 parts |
| Photoradical generator (diphenyl(2,4,6-trimethoxybenzoyl)phosphine oxide, LECIRIN TPO from BASF) | 10 parts |
| Photo-base generator (anisoin N-cyclohexylcarbamate, ANC-101 from Midori Kagaku Co., Ltd.) | 10 parts |
| Cyan pigment subjected to surface treatment (MICROLITH-Blue 4G-K from BASF) | 6 parts |
| Dispersant (a comb-form polyester polymer having an amine-based functional group, SOLSPERSE 32000 from Lubrizol Advanced Materials, Inc.) | 5 parts |

The thus prepared cyan ink was applied on a white PET film using a wire bar #4 having a wire with a diameter of 0.1 mm, and the coated ink layer was exposed to ultraviolet light for 2 second, which was emitted by the above-mentioned spot-type ultraviolet crosslinking device, AICURE UJ20 from Panasonic Electric Works Automation Controls Co., Ltd., to be crosslinked. The resultant crosslinked ink layer had a clear cyan color.

Example 6

The procedure for preparation and evaluation of the crosslinked clear ink layer in Example 1 was repeated except that the photoradical generator (IRGACURE 184) was replaced with 15 parts of another photoradical generator, ethyl (2,4,6-trimethylbenzoyl)phenylphosphinate (LUCIRIN TPO-L from BASF).

The resultant crosslinked clear ink layer was clear and glossy, and the color difference (ΔE) between the crosslinked clear ink layer and the white PET film was 4.8.

Comparative Example 1

The procedure for preparation and evaluation of the crosslinked clear ink layer in Example 1 was repeated except that the photoradical generator (IRGACURE 184) was replaced with 10 parts of another photoradical generator, 2-dimethylamino-2-(4-methylbenzyl)-1-(4-morphorinophenyl)butanone (IRGACURE 379 from BASF), and the photo-base generator (ANC-101 from Midori Kagaku Co., Ltd.) was not added.

The resultant crosslinked clear ink layer were yellowed, and the color difference (ΔE) between the crosslinked ink layer and the white PET film was 12.2.

Comparative Example 2

The procedure for preparation and evaluation of the crosslinked clear ink layer in Example 1 was repeated except that the photoradical generator (IRGACURE 184) was replaced with 10 parts of another photoradical generator, 4-benzoyl-4'-methyldiphenylsulfide KAYACURE BMS from Nippon Kayaku Co., Ltd., and the photo-base generator (ANC-101 from Midori Kagaku Co., Ltd.) was not added.

The resultant crosslinked clear ink layer were yellowed, and the color difference (ΔE) between the crosslinked clear ink layer and the white PET film was 6.0.

Comparative Example 3

The procedure for preparation and evaluation of the crosslinked clear ink layer in Example 1 was repeated except that the photo-base generator (ANC-101 from Midori Kagaku Co., Ltd.) was not added.

As a result, the resultant clear ink layer was insufficiently crosslinked, and was tacky.

Comparative Example 4

The procedure for preparation and evaluation of the crosslinked clear ink layer in Example 1 was repeated except that the photoradical generator (IRGACURE 184) was not added.

As a result, the resultant clear ink layer was insufficiently crosslinked, and was tacky.

Additional modifications and variations of this disclosure are possible in light of the above teachings. It is therefore to be understood that within the scope of the appended claims the invention may be practiced other than as specifically described herein.

What is claimed is:

1. An ultraviolet crosslinking ink comprising:
   a radically polymerizable and anionically polymerizable monomer;
   a photoradical generator; and
   a photo-base generator,
   wherein a content of the photoradical generator in the ultraviolet crosslinking ink is from 1% to 30% by weight based on a weight of the radically polymerizable and anionically polymerizable monomer components included in the ink, and
   a content of the photo-base generator in the ultraviolet crosslinking ink is from 0.1% to 20% by weight based on the weight of the ink.

2. The ultraviolet crosslinking ink according to claim 1 further comprising:
   a colorant.

3. The ultraviolet crosslinking ink according to claim 2, wherein the colorant is a pigment.

4. The ultraviolet crosslinking ink according to claim 3, wherein the pigment is C.I. Pigment Blue 15:3 or C.I. Pigment Blue 15:4.

5. An inkjet cording method comprising:
   ejecting the ultraviolet cross linking ink according to claim 2 toward a surface of a recording material to form an ink image thereon, and
   irradiating the ink image with ultraviolet light using a light emitting diode.

6. An inkjet recording method comprising:
   coating the surface of a recording material with an ultraviolet crosslinking clear ink before forming an ink image thereon,
   wherein the ultraviolet crosslinking clear ink includes:
   a radically polymerizable and anionically polymerizable monomer;
   a photoradical generator;
   a photo-base generator; and
   no colorant,
   wherein a content of the photoradical generator in the ultraviolet crosslinking clear ink is from 1% to 30% by weight based on a weight of the radically polymerizable and anionically polymerizable monomer components included in the ink, and
   a content of the photo-base generator in the ultraviolet crosslinking clear ink is from 0.1% to 20% by weight based on the weight of the ink.

* * * * *